(12) United States Patent
Kaushik

(10) Patent No.: US 11,057,398 B2
(45) Date of Patent: Jul. 6, 2021

(54) DETECTING POISONING ATTACKS OF INTERNET OF THINGS (IOT) LOCATION BEACONS IN WIRELESS LOCAL AREA NETWORKS (WLANS) WITH SILENCE PERIODS

(71) Applicant: Fortinet, Inc., Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 21 days.

(21) Appl. No.: 15/199,958

(22) Filed: Jun. 30, 2016

(65) Prior Publication Data

US 2018/0007067 A1 Jan. 4, 2018

(51) Int. Cl.
| | |
|---|---|
| *H04L 29/06* | (2006.01) |
| *H04W 4/029* | (2018.01) |
| *H04W 12/122* | (2021.01) |
| *H04W 84/12* | (2009.01) |

(52) U.S. Cl.
CPC ...... *H04L 63/1416* (2013.01); *H04L 63/1483* (2013.01); *H04W 4/029* (2018.02); *H04W 12/122* (2021.01); *H04W 84/12* (2013.01)

(58) Field of Classification Search
CPC ..... H04L 63/08; H04L 63/0876; H04L 63/10; H04L 63/107; H04L 63/12; H04L 63/14; H04L 63/1416; H04L 63/1425; H04L 63/1433; H04L 63/1441; H04L 63/1483; H04W 4/00; H04W 4/008; H04W 4/02; H04W 4/023; H04W 4/025; H04W 4/028; H04W 4/029; H04W 4/04; H04W 4/043; H04W 12/06; H04W 12/08; H04W 12/10; H04W 12/12; H04W 12/1202; H04W 12/1222; H04W 84/10; H04W 84/12
See application file for complete search history.

(56) References Cited

U.S. PATENT DOCUMENTS

| | | | | |
|---|---|---|---|---|
| 2015/0005011 | A1* | 1/2015 | Nehrenz | H04W 4/02 455/456.3 |
| 2015/0334569 | A1* | 11/2015 | Rangarajan | H04W 12/08 726/4 |
| 2016/0014600 | A1* | 1/2016 | Hanson | H04W 12/06 705/347 |
| 2016/0050219 | A1* | 2/2016 | Niewczas | H04W 12/06 726/5 |
| 2016/0100311 | A1* | 4/2016 | Kumar | H04W 4/80 726/7 |
| 2016/0294844 | A1* | 10/2016 | Woo | H04W 4/021 |

(Continued)

*Primary Examiner* — Robert B Leung
*Assistant Examiner* — Adrian Stoica
(74) *Attorney, Agent, or Firm* — Law Office Of Dorian Cartwright; Dorian Cartwright

(57) ABSTRACT

Poisoning attacks by spoofing location beacons in a WLAN are detected using silence periods. A location beacon identifier is received from a mobile device allegedly within range of a location device transmitting location beacons, along with a timestamp of transmission for each of the location beacons. Also silence periods associated with the location device, during which transmissions of location beacons are temporarily discontinued, and which are unknown to the public, are determined or retrieved. The location beacon transmission time is compared to the silence periods. Responsive to the location beacon transmission time corresponding to at least one of the silence periods, the location device flagged as poisoned.

7 Claims, 4 Drawing Sheets

(56) References Cited

U.S. PATENT DOCUMENTS

2016/0360418 A1* 12/2016 Guan .................. H04L 63/1425
2017/0048679 A1*  2/2017 Chao ..................... H04W 4/028
2017/0208091 A1*  7/2017 Whitsell ............... H04W 4/023

* cited by examiner

DETECTING POISONING ATTACKS OF INTERNET OF THINGS (IOT) LOCATION BEACONS IN WIRELESS LOCAL AREA NETWORKS (WLANS) WITH SILENCE PERIODS

FIELD OF THE INVENTION

The invention relates generally to Wi-Fi computer networking, and more specifically, to detecting poisoning attacks for location beacons.

BACKGROUND iBeacon location technology is a protocol developed by Apple and as a platform has opened up a myriad of application development. Generally, a mobile device within range of an iBeacon tag receives an identification that is uploaded to an access point or other network device. A location of the iBeacon is known, so the reception by a particular mobile device provides a location. Based on the location, passive applications can maintain statistics. For example, a consumer can be tracked around a store for shopping behavior analysis alone, or in the aggregate. Active applications can offer the consumer coupons based on a real-time location determination.

Unfortunately, with new technology platforms comes new vulnerabilities for unscrupulous persons and processes. In more detail, because the iBeacon technology is inherently open an unsecure format, spoofing iBeacon signals is easily accomplished. In one example, the transmissions of an iBeacon tag can be recorded and replicated at a different location, thereby poisoning data collection with invalid information.

What is needed is a robust technique for detecting poisoning attacks on iBeacons and other location beacons with periods of transmission silence that would not be known to malicious parties observing iBeacons just for tags.

SUMMARY

The above-mentioned shortcomings are addressed by systems, methods and computer-readable medium (non-transitory) for detecting spoofed location beacons using silence periods.

In one embodiment, a location beacon identifier is received from a mobile device allegedly within range of a location device transmitting location beacons, along with a timestamp of transmission for each of the location beacons. Also silence periods associated with the location device, during which transmissions of location beacons are temporarily discontinued, and which are unknown to the public, are determined or retrieved. The location beacon transmission time is compared to the silence periods. Responsive to the location beacon transmission time corresponding to at least one of the silence periods, the location device flagged as poisoned.

Advantageously, computer devices are more reliable by having locations determine with more integrity and reliability.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Hand-off control systems, computer-implemented methods, and (non-transitory) computer-readable mediums for handing-off calls from a cellular network to a data network, are described. iBeacons are generally referred to herein, however, one of ordinary skill in the art will recognize application of the techniques described herein to any location beacon (e.g., Eddystone by Google or near field communication).

Figure 1:
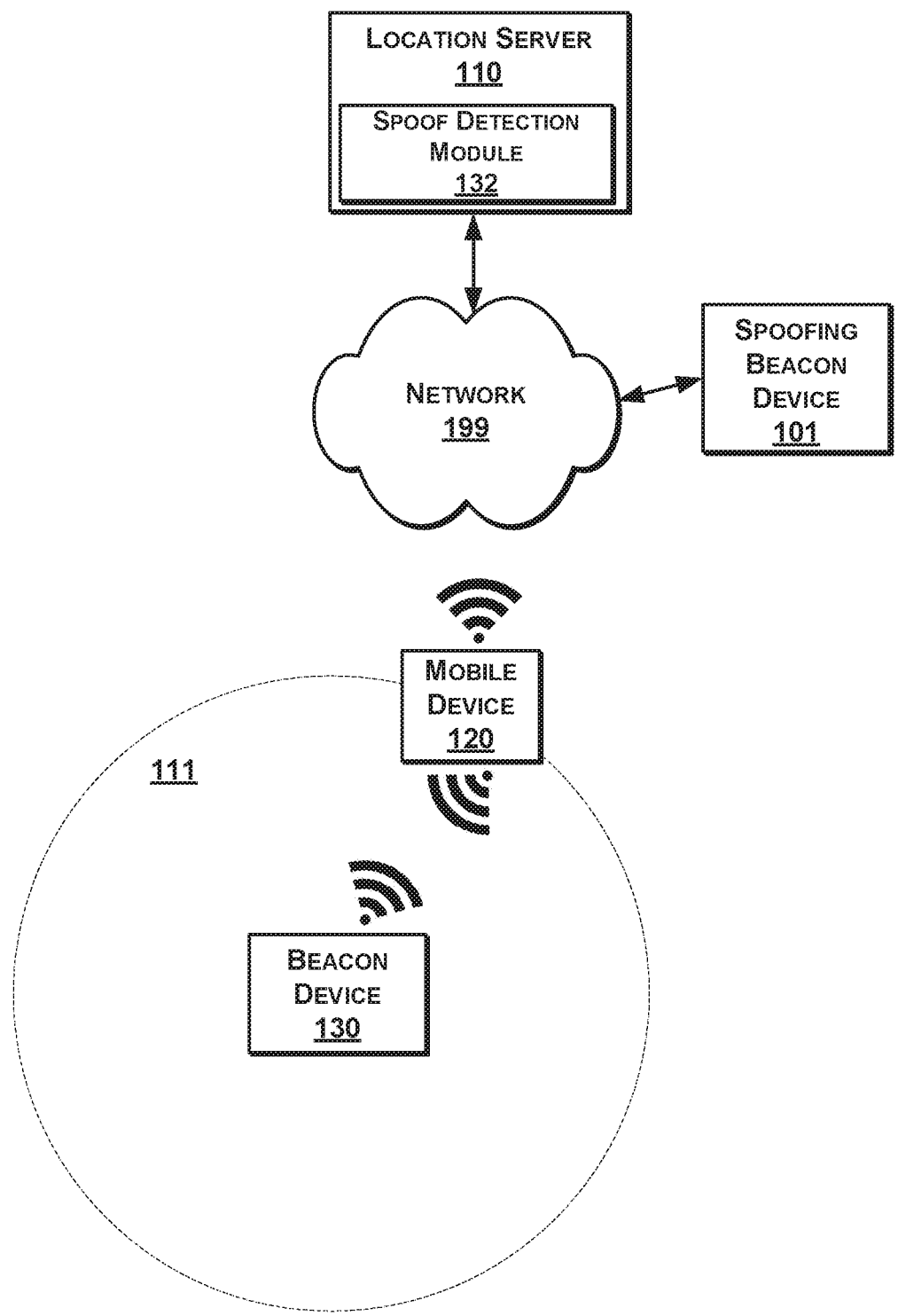
FIG. 1 is a block diagram illustrating a system for detecting location beacon spoofs, according to an embodiment.
Figure 2:
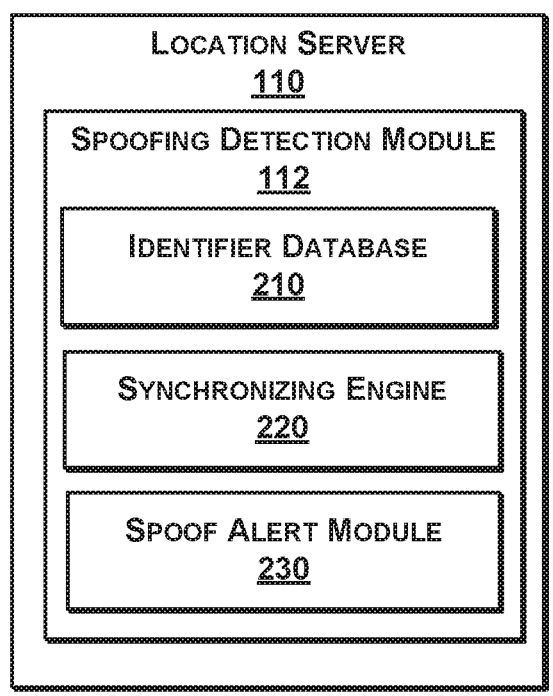
FIG. 2 is a more detailed block diagram of an location server of FIG. 1, according to an embodiment.
Figure 3:
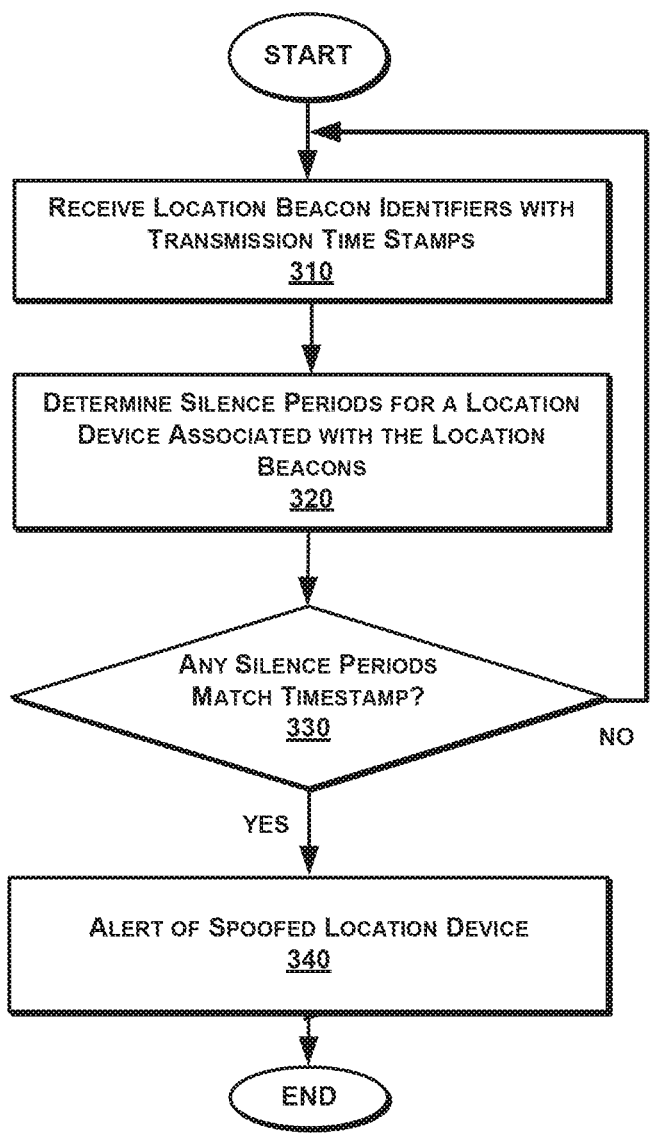
FIG. 3 is a flow chart illustrating a method for detecting location beacon spoofs, according to an embodiment.

Systems for Location Spoof Detection (FIG. 1-3)

FIG. 1 is a block diagram illustrating a system 100 for detecting location beacon spoofs, according to an embodiment. The system 100 comprises a location server 110, mobile device 120, beacon device 140, and spoofing beacon device 101, communicatively coupled through a network 188. The location server 110 and the spoofing beacon device 101 are preferably connected to the network 199 with a wired connection, while the mobile device 120 and the beacon device 130 can be wirelessly connected (the mobile device 120 can connect through an access point). Additional network components can also be part of the system 100, such as firewalls, virus scanners, routers, switches, application servers, databases, as well as controllers, access points, access switches, stations, and the like. For instance, embodiments of the system 100 can be implemented in conjunction with a network security system, for example, the FortiGate Network Security platform by Fortinet of Sunnyvale, Calif. The network components can be implemented as hardware, software, or a combination of both.

Wireless components preferably use communication protocols such as IEEE 802.11 n and IEEE 802.11 ac wave 2, in addition to other protocols such as other IEEE 802.11s, IEEE 802.3, Bluetooth, 3G and 4G. The enterprise network can serve, for example, a business enterprise, a hospital or system of hospital, school, building, a private network, or the like. The enterprise network 101 can provide access to a wide area network or the Internet in some embodiments. Alternatively, the enterprise network 101 can be distributed over the Internet, in other embodiments. A combination of wired and wireless devices can be connected, as well as only wireless devices or only wired devices. The enterprise network can be, for example, the Internet, a cellular network, a larger enterprise network to which the enterprise network is a smaller component of, or a combination of network types.

The location server 110 includes a spoof detection module 112 which uses silence periods for iBeacon transmissions to detect the spoofing beacon device 101. When receiving iBeacon identifiers along with a time stamp, the location server 110 refers to silence periods in which no iBeacons from the beacon device 130. If a transmission was made during a silence period, the spoof detection module 132 flags as spoofed. The silence periods can be unique for each device or uniform across a certain network or a specific entity or user. Alerts can be sent out or the location server 110 can ignore additional messages with the spoofed identifier. The location server 110 can be owned by a single entity or be a third party service that has many different secured user accounts, for example. The location server 110 is described in further detail below with respect to FIG. 2.

The mobile device 120 senses location beacons being broadcast from the beacon device 130, and extracts an identifier. Responsive to sending the identifier to the location server 110, a location in the form of coordinates or otherwise are returned to the mobile device 120. Many applications within the mobile device 120 can make use of the location information, including the operating system and applications. For example, a scavenger hunt mobile app can receive locations from the operating system or derive locations directly from the location server 110.

The beacon device 130 periodically broadcasts location beacons or iBeacons from a static location. The beacons include an identifier of the beacon device 130 which can be looked up on the location sever 110. The identifier can be several byes long and universally unique. Silence periods are programmed into the beacon periods, and synchronized with the location server 110. The silence periods can be produced based on an algorithm, a key available to both the beacon device 130 and the location server 110 or by other techniques that deviate from the assumed periodic broadcasts. Specific silence periods can also be downloaded or programmed to the beacon device 130. In some cases, the beacon device 130 is a full-fledged computing device. But in other cases, the beacon device 130 is a low-power active or passive tag. The beacon device 130 can operate from a battery that lasts several months to several years.

The spoofing beacon device 101 can be operated by a malicious entity or process. To configure, the beacon device 130 is observed for legitimate location beacons that are then replicated by the spoofing beacon device 101. iBeacons are typically not secured to encourage wide deployment. Many location systems broadcast location beacons in a periodic manner, and thus, the spoofing beacon device 101 assumes the same operation. However, time stamps generated by the spoofing beacon device 101 will be outside of the shared algorithm of the legitimate locationing. In one case, the spoofing beacon device 101 generates bogus location identification information and time stamps to send to the location server 110. In yet another case, the spoofing beacon device 101, configured with a location broadcasting application, misleads stations within range by broadcasting fake beacons that are sent to the location server 110 by unknowing mobile devices. The spoofing beacon device 101 includes a transmitter such a Bluetooth low energy device. Processing can be optimized for beacon broadcasting with low power.

FIG. 2 is a more detailed block diagram of the location server 110 of FIG. 1, according to an embodiment. The location server 110 comprises an identifier database 210, a synchronizing engine 220, and a spoof alert module 230.

The identifier database 210 tracks locations of the beacon device 130 and many other beacon devices. Locations can be updated from time to time, but the identifier remains constant. In one case, a mobile scanner with a GPS location scans the beacon device 130 and uploads a location. In other cases, locations are managed manually through an interface.

The synchronizing engine 220 relies upon a timing algorithm that matches the beacon device 130. In real-time or batch, legitimate broadcast times can be calculated for comparison.

The spoof alert module 230 compares legitimate broadcast times against actual time stamps for broadcast received from applications. When an anomaly occurs, the spoof alert system 230 can respond in various manners to remediate any potential damage. A user of the mobile device 120 can be alerted through the operating system or app. A network administrator for the network 199 can be sent a message by e-mail or SMS text. Further messages from the spoofing beacon device 101 can be ignored. Some embodiments can shut down locationing services altogether to quarantine the system 100.

Methods for Location Spoof Detection (FIG. 3)

FIG. 3 is a flow chart illustrating a method 300 for detecting location beacon spoofs, according to an embodiment. One of ordinary skill in the art will recognize that the method 300 is non-limiting as other embodiments can have more or less steps and can be performed in a different order. The method 300 can be implemented in the system 100 of FIG. 1 or in other components.

Location beacon identifiers are received from a mobile device, along with timestamps (step 310). Silence periods associated with the location device are determined (step 320). In some cases, the silence periods are predetermined and stored as a list, and in other cases the silence periods are calculated from a formula or algorithm. The silence periods are compared to time stamps (step 330). A single anomaly or several events may be required to mismatch. Either way, a location device is flagged as poisoned when the threshold is met. A spoofing location device can also be marked by saving a MAC address, profile, or other unique identifier (step 340).

Figure 4:
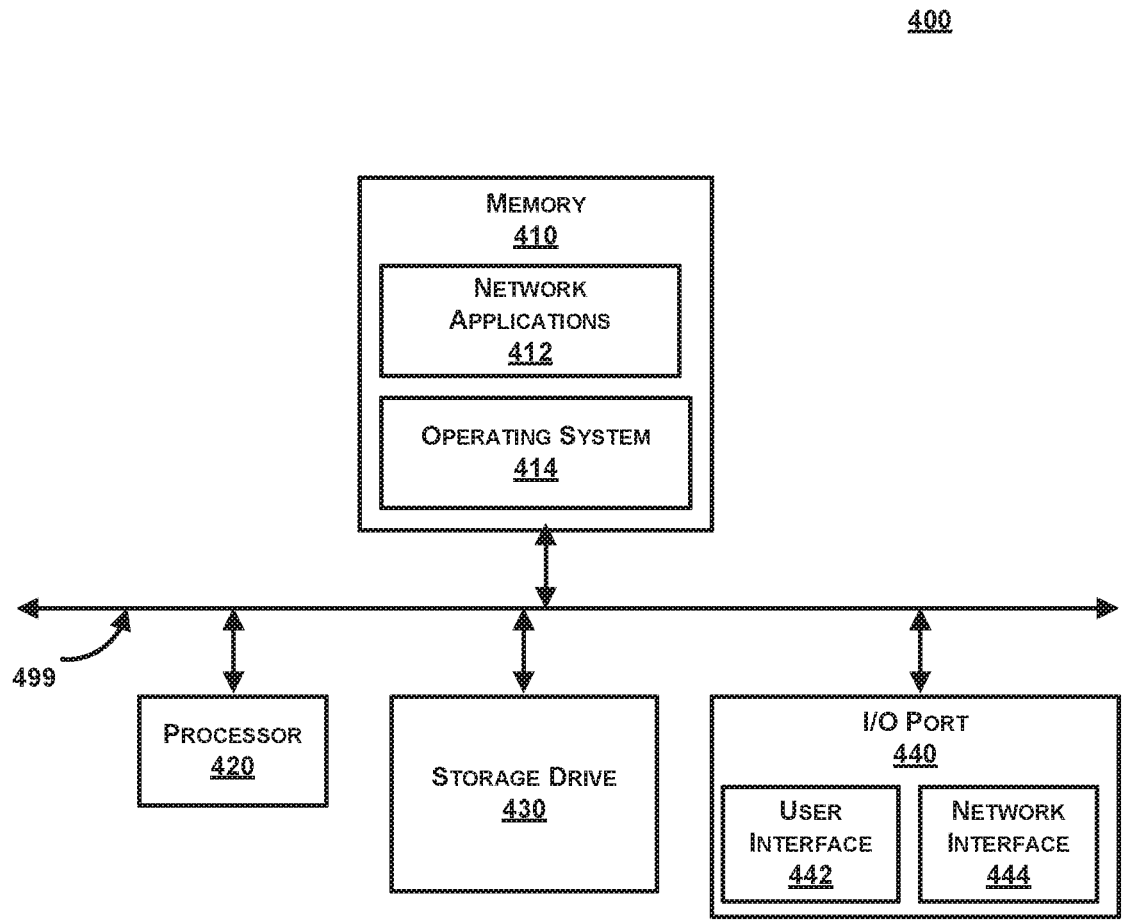
FIG. 4 is a block diagram illustrating an exemplary computing device, according to one embodiment.

Generic Computing Device (FIG. 4)

FIG. 4 is a block diagram illustrating an exemplary computing device 400 for use in the system 100 of FIG. 1, according to one embodiment. The computing device 400 is an exemplary device that is implementable for each of the components of the system 100, including the location server 110 and the mobile device 120. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 440, and an I/O port 440. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX42, or IRIX64. Other operating systems may be used. Microsoft Windows is a trademark of Microsoft Corporation.

The processor 420 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like.

Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 440

The storage drive 440 can be any non-volatile type of storage such as a magnetic disc, EEPROM, Flash, or the like. The storage drive 440 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a location server on a data communication network wirelessly coupled to a location device and a spoof device for improving network security by detecting spoofed location beacons with silence periods, the method comprising the steps of:

storing a plurality of location beacon identifiers, each in association with a physical location;

receiving, from a station over the data communication network at a network interface of the location server, a location beacon identifier and a timestamp of transmission received by the station in a spoofed location beacon from a spoof device within range of a location device transmitting location beacons having the location beacon identifier corresponding to one of the stored plurality of location beacon identifiers, wherein the spoofed device broadcasts a plurality of spoofed location beacons, each spoofed location beacon having the location beacon identifier and a corresponding timestamp of transmission, and wherein the station receives broadcasts of the location beacon identifier while within radio range of the location device or the spoof device;

generating, at the network interface, silence periods associated with the location device using a shared synchronizing algorithm, wherein during the silence periods transmissions of location beacons are temporarily discontinued, at least a part of the silent period deviating from assumed periodic broadcasts;

comparing, with a processor of the location server, a timestamp of transmission for the location beacons to times of the silence periods;

responsive to the location beacon transmission time corresponding to at least one of the silence periods times, flagging, by the processor, the spoof device as poisoned;

determining a location of the station from at least one other location beacon received from the location device, including ignoring the location beacon transmitted from the spoof device; and sending the determined location to the station for utilization by a location-based service.

2. The method of claim 1, wherein the location beacons comprise iBeacons.

3. The method of claim 1, further comprising:

calculating the silence periods from a formula or algorithm shared with the location device.

4. The method of claim 1, wherein the spoof device allegedly within range of the location device transmitting location beacons is actually disposed remotely from the range.

5. The method of claim 1, wherein the location beacons are broadcast in an unsecured manner.

6. A non-transitory computer-readable medium storing source code that, when executed by a processor, performs a computer-implemented method in a location server on a data communication network wirelessly coupled to a location device and a spoof device for improving network security by detecting spoofed location beacons with silence periods, the method comprising the steps of:

storing a plurality of location beacon identifiers, each in association with a physical location;

receiving, from a station over the data communication network at a network interface of the location server, a location beacon identifier and a timestamp of transmission received by the station in a spoofed location beacon from a spoof device within range of a location device transmitting location beacons having the location beacon identifier corresponding to one of the stored plurality of location beacon identifiers, wherein the spoofed device broadcasts a plurality of spoofed location beacons, each spoofed location beacon having the location beacon identifier and a corresponding timestamp of transmission, and wherein the station receives broadcasts of the location beacon identifier while within radio range of the location device or the spoof device;

generating, at the network interface, silence periods associated with the location device using a shared synchronizing algorithm, wherein during the silence periods transmissions of location beacons are temporarily discontinued, at least a part of the silent period deviating from assumed periodic broadcasts;

comparing, with a processor of the location server, a timestamp of transmission for the location beacons to times of the silence periods;

responsive to the location beacon transmission time corresponding to at least one of the silence periods times, flagging, by the processor, the spoof device as poisoned;

determining a location of the station from at least one other location beacon received from the location device, including ignoring the location beacon transmitted from the spoof device; and sending the determined location to the station for utilization by a location-based service.

7. A system having a location server on a data communication network wirelessly coupled to a location device and a spoof device for improving network security by detecting spoofed location beacons with silence periods, the location server comprising:

a memory to store a plurality of location beacon identifiers, each in association with a physical location;

a network interface, coupled the data communication network, to receive a location beacon identifier and a timestamp of transmission received by the station in a spoofed location beacon from a spoof device within range of a location device transmitting location beacons having the location beacon identifier corresponding to one of the stored plurality of location beacon identifiers, wherein the spoofed device broadcasts a plurality of spoofed location beacons, each spoofed location beacon having the location beacon identifier and a corresponding timestamp of transmission, and wherein the station receives broadcasts of the location beacon identifier while within radio range of the location device or the spoof device, wherein the network interface generates silence periods associated with the location device using a shared synchronizing algorithm, wherein during the silence periods transmissions of location beacons are temporarily discontinued, at least a part of the silent period deviating from assumed periodic broadcasts; and a processor, coupled to the network interface, to compare a timestamp of transmission for the location beacons to times of the silence periods, wherein the processor, responsive to the location beacon transmission time corresponding to at least one of the silence period times, flags the spoof device as poisoned, wherein the processor determines a location of the station from at least one other location beacon received from the location device, including ignoring the location beacon transmitted from the spoof device, and wherein the processor utilizes the network interface to send the determined location to the station for a utilization by location-based service.

\* \* \* \* \*